United States Patent
Bokish et al.

(10) Patent No.: US 8,954,325 B1
(45) Date of Patent: Feb. 10, 2015

(54) SPEECH RECOGNITION IN AUTOMATED INFORMATION SERVICES SYSTEMS

(75) Inventors: Bruce Bokish, Raleigh, NC (US);
Michael Craig Presnell, Durham, NC (US)

(73) Assignee: Rockstar Consortium US LP, Plano, TX (US)

(*) Notice: Subject to any disclaimer, the term of this patent is extended or adjusted under 35 U.S.C. 154(b) by 3226 days.

(21) Appl. No.: 10/805,975

(22) Filed: Mar. 22, 2004

(51) Int. Cl.
G10L 21/00 (2013.01)
G10L 25/00 (2013.01)
G10L 15/00 (2013.01)
G10L 15/06 (2013.01)

(52) U.S. Cl.
USPC .......................................... 704/244; 704/275

(58) Field of Classification Search
CPC ....... G10L 15/01; G10L 15/06; G10L 15/065; G10L 15/22; G10L 15/187; G10L 15/144
USPC .................................................. 704/275, 244
See application file for complete search history.

(56) References Cited

U.S. PATENT DOCUMENTS

| | | | | |
|---|---|---|---|---|
| 4,979,206 A * | 12/1990 | Padden et al. | ............ | 379/88.01 |
| 5,033,088 A * | 7/1991 | Shipman | ............ | 704/275 |
| 5,163,083 A * | 11/1992 | Dowden et al. | ............ | 379/88.03 |
| 5,329,608 A * | 7/1994 | Bocchieri et al. | ............ | 704/243 |
| 5,535,120 A * | 7/1996 | Chong et al. | ............ | 704/3 |
| 5,875,426 A * | 2/1999 | Bahl et al. | ............ | 704/255 |
| 5,897,616 A * | 4/1999 | Kanevsky et al. | ............ | 704/246 |
| 5,915,001 A * | 6/1999 | Uppaluru | ............ | 379/88.22 |
| 5,991,364 A * | 11/1999 | McAllister et al. | ............ | 379/88.01 |
| 6,138,100 A * | 10/2000 | Dutton et al. | ............ | 704/275 |
| 6,182,045 B1 * | 1/2001 | Kredo et al. | ............ | 704/270 |
| 6,195,641 B1 * | 2/2001 | Loring et al. | ............ | 704/275 |
| 6,253,181 B1 * | 6/2001 | Junqua | ............ | 704/255 |
| 6,442,519 B1 * | 8/2002 | Kanevsky et al. | ............ | 704/243 |
| 6,446,076 B1 * | 9/2002 | Burkey et al. | ............ | 707/102 |
| 6,470,357 B1 | 10/2002 | Garcia, Jr. et al. | | |
| 6,477,500 B2 * | 11/2002 | Maes | ............ | 704/275 |
| 6,480,819 B1 * | 11/2002 | Boman et al. | ............ | 704/9 |
| 6,487,534 B1 * | 11/2002 | Thelen et al. | ............ | 704/270 |
| 6,493,671 B1 * | 12/2002 | Ladd et al. | ............ | 704/270 |
| 6,532,446 B1 * | 3/2003 | King | ............ | 704/270.1 |
| 6,553,113 B1 * | 4/2003 | Dhir et al. | ............ | 379/265.02 |
| 6,671,670 B2 * | 12/2003 | Levin et al. | ............ | 704/270 |

(Continued)

OTHER PUBLICATIONS

Non-Final Office Action for U.S. Appl. No. 10/774,083 mailed Jul. 14, 2006, 8 pages.

(Continued)

*Primary Examiner* — Eric Yen
(74) *Attorney, Agent, or Firm* — Withrow & Terranova, PLLC

(57) ABSTRACT

The present invention allows feedback from operator workstations to be used to update databases used for providing automated information services. When an automated process fails, recorded speech of the caller is passed on to the operator for decision making. Based on the selections made by the operator in light of the speech or other interactions with the caller, a comparison is made between the speech and the selections made by the operator to arrive at information to update the databases in the information services automation system. Thus, when the operator inputs the words corresponding to the speech provided at the information services automation system, the speech may be associated with those words. The association between the speech and the words may be used to update different databases in the information services automation system.

16 Claims, 4 Drawing Sheets

(56) References Cited

U.S. PATENT DOCUMENTS

| | | | |
|---|---|---|---|
| 6,714,631 B1* | 3/2004 | Martin et al. | 379/88.02 |
| 6,792,096 B2* | 9/2004 | Martin et al. | 379/218.01 |
| 6,799,163 B2* | 9/2004 | Nolan | 704/273 |
| 6,801,893 B1* | 10/2004 | Backfried et al. | 704/257 |
| 6,873,951 B1* | 3/2005 | Lin et al. | 704/251 |
| 6,882,707 B2* | 4/2005 | Engelke et al. | 379/52 |
| 6,911,916 B1* | 6/2005 | Wang et al. | 340/825 |
| 6,944,593 B2* | 9/2005 | Kuzunuki et al. | 704/270.1 |
| 6,999,923 B1* | 2/2006 | Ablondi et al. | 704/231 |
| 7,047,193 B1* | 5/2006 | Bellegarda | 704/254 |
| 7,149,694 B1* | 12/2006 | Harb et al. | 704/270.1 |
| 7,174,300 B2* | 2/2007 | Bush | 704/275 |
| 7,191,133 B1* | 3/2007 | Pettay | 704/270 |
| 7,197,459 B1* | 3/2007 | Harinarayan et al. | 704/270.1 |
| 7,243,072 B2* | 7/2007 | Kotzin | 704/270.1 |
| 7,277,851 B1* | 10/2007 | Henton | 704/235 |
| 7,398,209 B2* | 7/2008 | Kennewick et al. | 704/255 |
| 7,401,023 B1* | 7/2008 | Schwartz et al. | 704/275 |
| 7,437,295 B2* | 10/2008 | Pitts et al. | 704/275 |
| 7,447,636 B1* | 11/2008 | Schwartz et al. | 704/275 |
| 7,487,095 B2* | 2/2009 | Hill et al. | 704/275 |
| 7,542,904 B2* | 6/2009 | Chestnut et al. | 704/257 |
| 7,555,431 B2* | 6/2009 | Bennett | 704/255 |
| 2002/0120447 A1* | 8/2002 | Charlesworth et al. | 704/254 |
| 2003/0105638 A1* | 6/2003 | Taira | 704/275 |
| 2003/0130847 A1* | 7/2003 | Case | 704/260 |
| 2003/0233235 A1* | 12/2003 | Park | 704/257 |
| 2004/0049388 A1* | 3/2004 | Roth et al. | 704/251 |
| 2004/0249636 A1* | 12/2004 | Applebaum et al. | 704/231 |
| 2004/0267528 A9* | 12/2004 | Roth et al. | 704/251 |
| 2005/0100153 A1 | 5/2005 | Pines et al. | |
| 2005/0102142 A1* | 5/2005 | Soufflet et al. | 704/246 |
| 2005/0203738 A1* | 9/2005 | Hwang | 704/243 |
| 2005/0221812 A9* | 10/2005 | Gailey et al. | 455/422.1 |
| 2007/0043566 A1* | 2/2007 | Chestnut et al. | 704/257 |
| 2007/0233487 A1* | 10/2007 | Cohen et al. | 704/255 |
| 2010/0057457 A1* | 3/2010 | Ogata et al. | 704/235 |

OTHER PUBLICATIONS

Final Office Action for U.S. Appl. No. 10/774,083 mailed Dec. 29, 2006, 12 pages.

Advisory Action for U.S. Appl. No. 10/774,083 mailed Mar. 2, 2007, 3 pages.

* cited by examiner

SPEECH RECOGNITION IN AUTOMATED INFORMATION SERVICES SYSTEMS

FIELD OF THE INVENTION

The present invention relates to information services, and in particular to improving speech recognition in information services automation systems.

BACKGROUND OF THE INVENTION

Information services systems have been implemented since the beginning of telephony communications. For various reasons, and historically based on the need for directory assistance, telephony subscribers could call an information services system, request particular information, and receive the information. As communications evolve, the sophistication of the information services systems and the type of information provided with these systems has significantly increased. Currently, information services systems provide all types of information, from traditional directory numbers and addresses to driving directions and movie listings.

As the need for information services increases, information services providers have implemented automated systems that are capable of handling certain requests in a fully automated fashion, without requiring operator assistance, by utilizing technologies such as speech recognition, speech synthesis, recorded speech playback, and digit detection. Naturally, there are numerous reasons, such as varying accents, dialects, and languages, which prevent these automated systems from being able to properly respond to all requests. As such, the requests that are not recognized or otherwise handled properly may be sent to a human operator, who will interact with the caller and provide the requested information.

Given the significant cost savings associated with automation, there is a continuing need to provide more accurate and reliable automation. The primary hurdle in automation is the difficulty in recognizing speech due to the various languages, accents, dialects, and pronunciations of words that formulate the caller's request for information. At this time, the speech recognition engines in these information services automation systems are only updated periodically, and these updates are not necessarily based on actual use, but rather on general predictions involving speech recognition patterns. Further, there is no mechanism to provide feedback to the automation system based on actions taken by the operator after the automation system has failed. There is a need to provide feedback to the automation system based on the operator's interaction with the caller to improve speech recognition, and thus the ability to automate future requests in a more effective manner.

SUMMARY OF THE INVENTION

The present invention allows feedback from operator workstations to be used to update databases used for providing automated information services. When an automated process fails, recorded speech of the caller is passed on to the operator for decision making. Based on the selections made by the operator in light of the speech of or other interactions with the caller, a comparison is made between the speech and the selections made by the operator to arrive at information to update the databases in the information services automation system. Thus, when the operator inputs the words corresponding to the speech provided at the information services automation system, the speech may be associated with those words. The association between the speech and the words may be used to update different databases in the information services automation system.

In one embodiment, the automation process involves processing the speech to detect phonemes, using the phonemes to detect words, and using the words to detect an entry that is associated with the information being requested by the caller. If there is a failure at any one of these detection stages, the speech is sent to the operator. When the operator listens to the speech and provides operator input corresponding to the words or entries, the various databases used to look up words based on phonemes, entries based on words, or information based on entries may be updated. As such, a word typed in by the operator may be associated with a group of phonemes for the speech. Similarly, an entry may be associated with a new word or group of words. The information services automation system may send information identifying the step in the automation process where the automation failed. As such, the particular database to update based on the operator input can be selected based on the point of failure.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
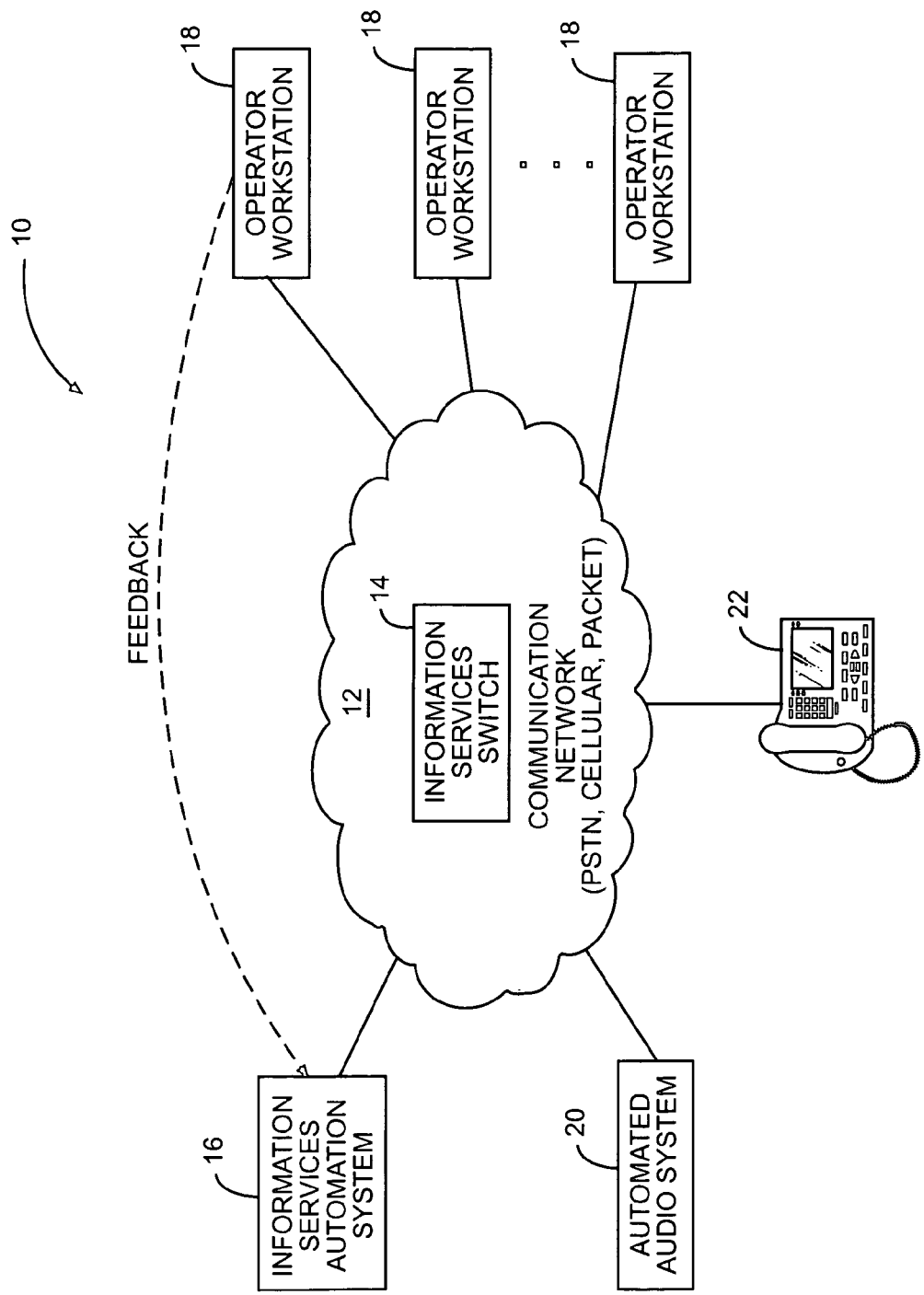
FIG. 1 is a block representation of an information services environment according to one embodiment of the present invention.

Turning now to FIG. 1, an information services environment 10 is illustrated according to one embodiment of the present invention. In general, a communication network 12 may include an information services switch 14, such as a circuit-switched based operator services switch or analogous cellular or packet-based switch, wherein incoming information services requests result in a voice-based communication session with an information services automation system 16. The communication network 12 may include any one or a combination of a Public Switched Telephone Network (PSTN), a cellular network, or a packet network. The information services automation system 16 will provide automated greetings and questions to which the caller will respond to formulate the information request. Initially, the information services automation system 16 will attempt to recognize the information spoken by the caller and provide the requested information. If the caller's request cannot be recognized or otherwise processed by the information services automation system 16, a voice session between the caller and an operator workstation 18 is established, wherein an operator will attempt to respond to the caller's request. The term "operator" is used to describe any human agent capable of providing any type of information services, including but not limited to directory assistance, traditional operator assistance, and enhanced information services. The information services do not need to be telephony based, and may include technical support, customer support, and the like.

During the transition from the information services automation system 16 to the operator workstation 18, the initial audible information provided by the caller that was recorded by the information services automation system 16 will be transferred to the operator workstation 18, such that the operator may listen to the recorded information without having to ask the caller to repeat the information. If necessary, the operator may communicate with the caller to clarify information or obtain additional information to assist in obtaining the requested information.

Once the requested information is obtained by the information services automation system 16 or by an operator at one of the operator workstations 18, a voice session is established between the caller and an automated audio system 20. The automated audio system 20 will then interact with the information services automation system 16 or the operator workstation 18 to obtain the requested information and deliver the requested information to the caller in a synthesized fashion. Notably, the functionality of the automated audio system 20 may be integrated with the information services automation system 16 or the operator workstations 18.

The information services automation system 16, operator workstations 18, and automated audio system 20 may communicate and cooperate with each other via any number of networks or signaling conventions. For the present invention, when the information services automation system 16 fails to provide a fully automated request, the results of the subsequent operator assistance is fed back to the information services automation system 16 to update the various databases used for automation in a manner increasing the likelihood that subsequent information requests will be automated. To initiate information services requests, a caller may use any type of telephony terminal 22 and initiate a voice session, such as a traditional telephone call, to information services wherein the call will be directed to the information services automation system 16 via the information services switch 14.

Figure 2:
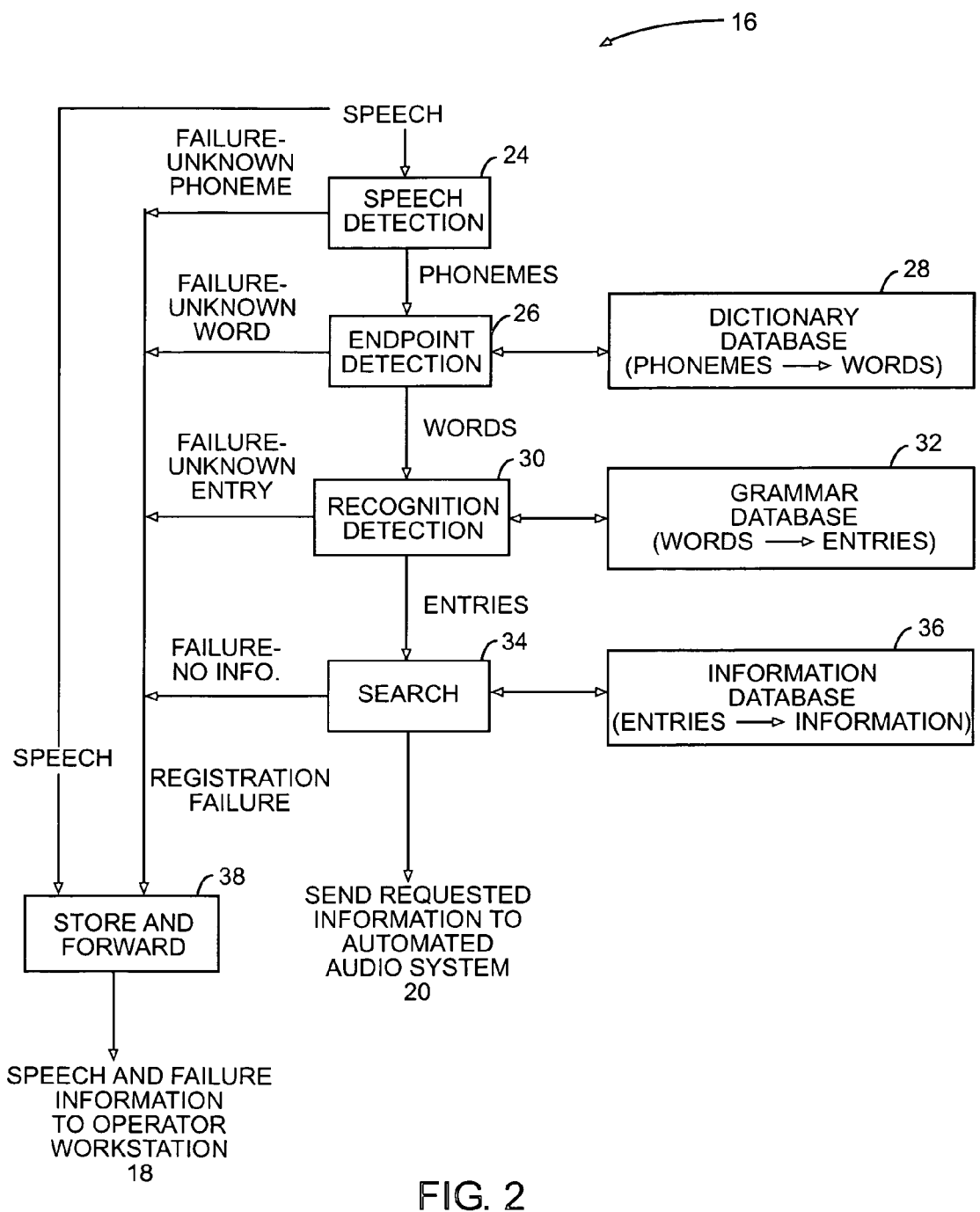
FIG. 2 is a block representation of an information services automation system according to one embodiment of the present invention.

Turning now to FIG. 2, an overview of the information services automation system 16 is illustrated according to one embodiment. Initially, the speech from the caller is received and processed by a speech detection function 24, which attempts to recognize phonemes of the incoming speech. Phonemes represent the basic elements of a spoken language. Accordingly, the speech detection function 24 will provide a sequence of defined phonemes corresponding to the incoming speech. The sequence of phonemes is sent to an endpoint detection function 26, which will detect the beginning and ending of words within the sequence of phonemes. Thus, there may be one or more groups of phonemes that correspond to words in the original speech. The endpoint detection function 26 will access a dictionary database 28 to determine actual words associated with the groups of phonemes. Accordingly, the dictionary database 28 will include a list of words and their associated groups of phonemes. Notably, any words may be associated with multiple groups of phonemes, which may correspond to different languages, accents, dialects, or pronunciations of the word. The words are then provided to a recognition detection function 30, which will process the words by accessing a grammar database 32 in an effort to determine an associated entry corresponding to the words. The resultant entries are then provided to a search function 34, which will access an information database 36 to obtain information associated with the determined entry. Thus, the grammar database 32 will list associations of words and corresponding entries, which will be found in the information database 36.

The original speech is broken into phonemes, which are converted to words by the endpoint detection function 26. The words are then converted to available entries by the recognition detection function 30. Different words or word sequences may be associated with a given entry. For example, the entry of "Joey's Pub and Pizza" may be associated with the following word or words: 1) Joey's Restaurant, 2) Joey's Pub, 3) Joey's Bar, 4) Joey's Pizza, 5) Joey's Pizza Pub, and 6) Joey's Pizza and Pub. The recognition detection function 30 and the grammar database 32 may be configured wherein each of the entries are not necessary but if a certain number of words match a decision is made on a desired entry. Once the entry is determined, the search function 34 will access the information database 36 to obtain the associated information. In this instance, the information may include directory assistance information including the directory number and address for Joey's Pizza and Pub, driving directions, menu information, specials, or any other information that may be desirable to provide to the caller or requested by the caller. Once the requested information is obtained, it is sent to the automated audio system 20 for delivery to the caller.

There are many potential points of failure in the automation process. For example, the speech detection function 24 may not be able to select phonemes, the endpoint detection function 26 may not be able to determine a word or words, the recognition detection function 30 may not be able to detect an entry, and the search function 34 may not be able to determine information for a given entry. If there is a failure at any of these points, a store and forward function 38 will send a recording of the speech to an available operator workstation 18. The store and forward function 38 may also indicate the type of failure or the point of failure in the automation process for the associated speech.

Figure 3:
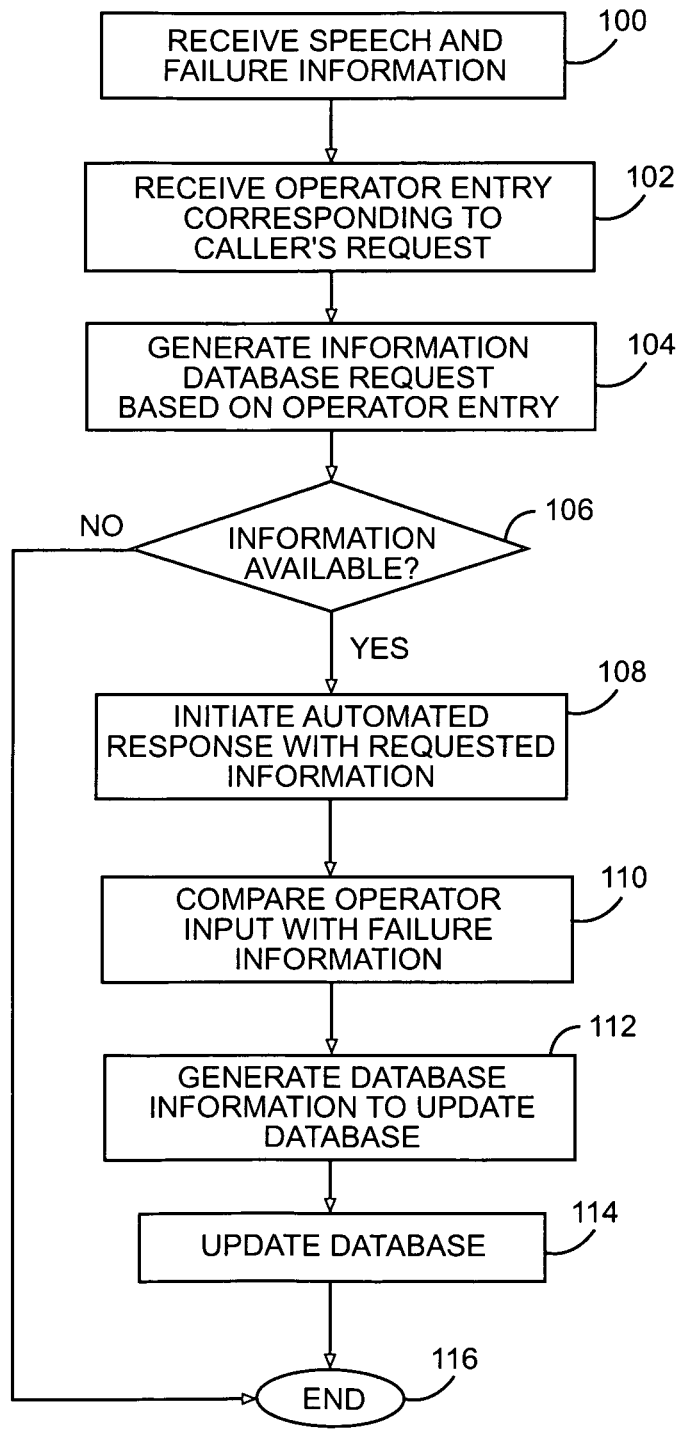
FIG. 3 is a flow diagram providing an overview of the operation of the present invention according to one embodiment.

Turning now to FIG. 3, a flow diagram is provided to illustrate the operation of the present invention according to one embodiment. In the illustrated embodiment, this process is implemented in the operator workstation 18, but those skilled in the art will recognize that the various steps may be implemented in or distributed among the operator workstation 18, the information services automation system 16, a third entity, or a combination thereof. Initially, the recorded speech from the caller, and possibly the failure information, is received at the operator workstation 18 (step 100). The operator will listen to the recorded speech, and either interpret the recorded speech or interact with the caller to obtain addition information to determine an entry to provide to the information database 36. Based on the recorded speech or information provided from the caller, the operator will provide an operator entry corresponding to the caller's request (step 102). Accordingly, the operator workstation 18 will then generate an information database request based on the operator entry (step 104). If the information for the entry is unavailable (step 106), the information services process will end (step 116), or the operator may ask the caller for additional information or clarification. If the information associated with the operator entry is available (step 106), the operator may recite the information or may initiate an automated response for the requested information from the automated audio system 20 (step 108). As such, the operator workstation 18 will effect the requested information to be provided to the automated audio system 20, which will then deliver the requested information in an audible format to the caller via the telephony terminal 22.

Instead of stopping the automated processing system at this point as with traditional systems, the present invention continues by providing feedback to the information services automation system 16 based on the decisions made by the operator. Accordingly, a comparison is made between the operator input and the provided failure information, which may relate to the phonemes, words, or entries, depending on when the failure occurred (step 110). The failure information may represent the point of failure, or may include the phonemes, words, or entries associated with the automation failure. Thus, the comparison of the failure information to the operator entry can take place on the appropriate level, such as the phoneme level, the word level, or the entry level. The databases are updated (step 114) and the process ends. For example, if the endpoint detection function 26 was unable to detect a word based on the given phonemes, the words associated with the entry ultimately provided by the operator may be associated with the group of phonemes of the request and added to the dictionary database 28. Thus, a new group of phonemes may be associated with an existing word, or a new word may be added to the dictionary database 28 in association with the group of phonemes. In the latter case, the grammar database 32 would be updated with a new word to associate with the entry as well. Once the comparison is made, database information is generated to update the pertinent databases, such as the dictionary database 28, the grammar database 32, and the information database 36 (step 112). In an effort to keep the databases from growing too large, the additional information resulting from feedback from the operator workstations 18 may be removed after a certain period of time or if available memory stores become low.

From the above, the recorded speech that was unable to be processed by the information services automation system 16 is compared in light of an entry provided by the operator at the operator workstation 18. The comparison may be between the given speech and the entry, the recorded speech and the words of the entry, as well as the recorded speech and the phonemes corresponding to the words of the entry. Thus, the actual speech recognition aspect associated with the dictionary database 28 and the grammar database 32 may be updated as well as the basic information database 36. Those skilled in the art will recognize variations in the different information services automation systems 16 and realize different ways to provide feedback for updating the information services automation system 16 in light of the above teachings.

Figure 4:
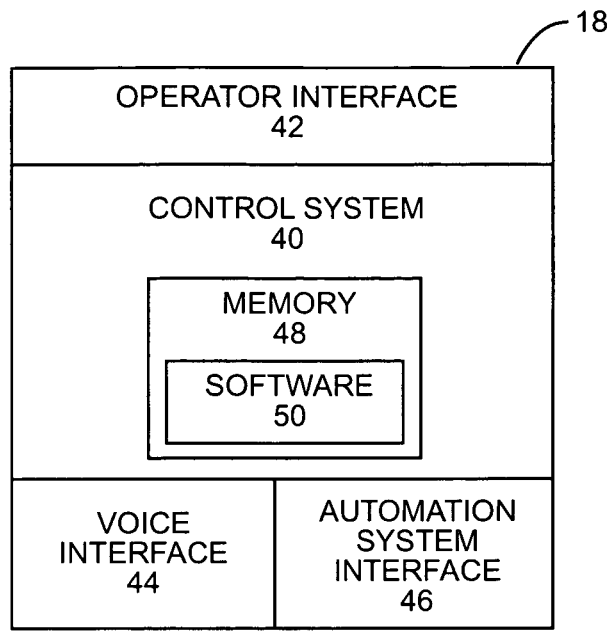
FIG. 4 is a block representation of an operator workstation according to one embodiment of the present invention.

Turning now to FIG. 4, a block representation of an operator workstation 18 is provided according to one embodiment of the present invention. The operator workstation 18 may take the form of a personal computer or workstation having a control system 40, which is associated with an operator interface 42 and one or more communication interfaces, such as a voice interface 44 and an automation system interface 46. The voice interface 44 will support the actual communication session or call to allow the operator to communicate with the caller. The automation system interface 46 will allow direct or indirect communications with the information services automation system 16, the automated audio system 20, or a combination thereof. The control system 40 may also be associated with memory 48 with sufficient software 50 to facilitate the functionality described above. Again, the term "operator" is used only to indicate a human agent who is involved in providing any type of information services.

Figure 5:
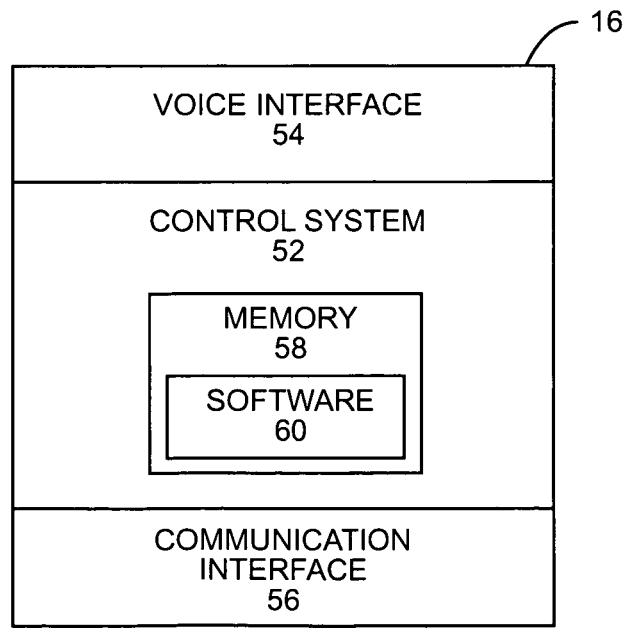
FIG. 5 is a block representation of an information services automation system according to one embodiment of the present invention.

Turning now to FIG. 5, a basic block representation of an information services automation system 16 is illustrated. The information services automation system 16 may include a control system 52 associated with a voice interface 54 for receiving the audible speech in association with an information services request from a telephony user, and a communication interface 56 to facilitate communications with the operator workstations 18, databases 28, 32, and 36, or any other entities with which communications are required. The control system 52 will include sufficient memory 58 having the requisite software 60 to facilitate the operation described above.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   a) receiving speech from an information services automation system, the speech being received in association with a request for information services where automation at the information services automation system failed;
   b) receiving, in association with the speech, failure indicia that identifies a step in an automation process in which automation for the speech failed, where the automation process provides information services;
   c) providing operator input based on the speech;
   d) comparing the operator input with the failure indicia;
   e) creating an update based on the comparison; and
   f) providing the update to a database used by the information services automation system, wherein the update corresponds to and is based at least in part on the failure indicia.

2. The method of claim 1 further comprising initiating delivery of a response to a telephony user where the response is responding to the request.

3. The method of claim 1 further comprising providing the speech to an operator.

4. The method of claim 1 wherein the update is a word to associate with a group of phonemes in the speech.

5. The method of claim 1 wherein the update is an entry to associate with a word in the speech, the entry corresponding to the operator input.

6. The method of claim 1 wherein the update is an entry to associate with a group of words in the speech, the entry corresponding to the operator input.

7. The method of claim 1 wherein the update relates to effectively associating a group of phonemes to an entry, the entry corresponding to the operator input.

8. The method of claim 1 further comprising:
   a) sending an information request in response to the request for information services, wherein the information request is based on the operator input;
   b) receiving information responsive to the information request; and c) effecting delivery of the received information to a user initiating the request for information services.

9. A system comprising:
a) an operator interface;
b) at least one communication interface; and
c) a control system associated with the operator interface and the at least one communication interface, the control system adapted to:
  i) receive speech from an information services automation system, the speech being received in association with a request for information services where automation at the information services automation system failed;
  ii) receive, in association with the speech, failure indicia that identifies a step in an automation process in which automation for the speech failed, where the automation process provides information services;
  iii) provide operator input based on the speech;
  iv) compare the operator input with the failure indicia;
  v) create an update based on the comparison; and
  vi) provide the update to a database used by the information services automation system, wherein the update corresponds to and is based at least in part on the failure indicia.

10. The system of claim 9 wherein the control system is further adapted to initiate delivery of a response to a telephony user, the response responding to the request.

11. The system of claim 9 wherein the control system is further adapted to provide the speech to an operator.

12. The system of claim 9 wherein the update is a word to associate with a group of phonemes in the speech.

13. The system of claim 9 wherein the update is an entry to associate with a word in the speech, the entry corresponding to the operator input.

14. The system of claim 9 wherein the update is an entry to associate with a group of words in the speech, the entry corresponding to the operator input.

15. The system of claim 9 wherein the update relates to effectively associating a group of phonemes to an entry, the entry corresponding to the operator input.

16. The system of claim 9 wherein the control system is further adapted to:
a) send an information request in response to the request for information services, wherein the information request is based on the operator input;
b) receive information responsive to the information request; and
c) effect delivery of the received information to a user initiating the request for information services.

\* \* \* \* \*